(12) United States Patent
Mizoguchi (10) Patent No.: US 10,496,072 B2
(45) Date of Patent: Dec. 3, 2019

(54) DISPLACEMENT ESTIMATION METHOD AND THERMAL DISPLACEMENT CORRECTION METHOD FOR MACHINE TOOL

(71) Applicant: Okuma Corporation, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/803,018

(22) Filed: Nov. 3, 2017

(65) Prior Publication Data
US 2018/0181103 A1    Jun. 28, 2018

(30) Foreign Application Priority Data

Dec. 22, 2016   (JP) .................................. 2016-249626

(51) Int. Cl.
*G05B 19/404*    (2006.01)
*B23Q 11/00*    (2006.01)
*B23Q 15/18*    (2006.01)

(52) U.S. Cl.
CPC ........ *G05B 19/404* (2013.01); *B23Q 11/0007* (2013.01); *B23Q 15/18* (2013.01); *B23Q 2220/006* (2013.01); *G05B 2219/49206* (2013.01)

(58) Field of Classification Search
CPC .............. G05B 19/404; G05B 19/4103; G05B 2219/49206; B23Q 11/0007; B23Q 15/18; B23Q 2220/006; F25B 49/02
USPC ........................................................ 700/175
See application file for complete search history.

(56) References Cited

U.S. PATENT DOCUMENTS

| 6,130,515 | A | * | 10/2000 | Nishimura | ........... | G05B 19/414 |
| | | | | | | 318/567 |
| 2006/0218811 | A1 | * | 10/2006 | Sato | ...................... | G05B 19/404 |
| | | | | | | 33/702 |
| 2010/0272529 | A1 | * | 10/2010 | Rozzi | ...................... | B23C 5/207 |
| | | | | | | 408/56 |
| 2011/0247317 | A1 | * | 10/2011 | Kondo | .................. | F01N 11/002 |
| | | | | | | 60/274 |

(Continued)

FOREIGN PATENT DOCUMENTS

| JP | 2002-301637 A1 | 10/2002 |
| JP | 2002-326141 A1 | 11/2002 |
| JP | 3897884 B2 | 3/2007 |

*Primary Examiner* — Brian W Wathen
*Assistant Examiner* — Alicia M. Choi
(74) *Attorney, Agent, or Firm* — Burr & Brown, PLLC (57) ABSTRACT

A temperature of a portion of which the temperature is difficult to directly measure is accurately estimated in a simple method.
In S1, information about a coolant discharging/stopping state is obtained. As the information about the coolant discharging/stopping state, a flag is used such that the flag represents 1 for the discharging state and the flag represents 0 for the stopping state. Next, in S2, temperature data is obtained from temperature sensors provided in components of a machine tool, a machining space, and a coolant tank. Next, in S3, lag process is performed for the coolant discharging/stopping state flag, and coefficients for measured temperatures of the coolant and the structure are calculated. Next, in S4, the measured temperatures are multiplied by the coefficients, and an estimated temperature of a portion to which the temperature sensor is not attached is calculated.

10 Claims, 5 Drawing Sheets

(56) References Cited

U.S. PATENT DOCUMENTS

| | | | |
|---|---|---|---|
| 2012/0165971 A1* | 6/2012 | Murahashi | B23Q 11/0007 700/175 |
| 2013/0190921 A1* | 7/2013 | Maekawa | B23Q 11/0007 700/177 |
| 2014/0113828 A1* | 4/2014 | Gilbert | H01L 39/126 505/100 |
| 2015/0102756 A1* | 4/2015 | Okita | H02P 29/60 318/473 |
| 2015/0286208 A1* | 10/2015 | Endou | G05B 19/404 700/175 |
| 2016/0121445 A1* | 5/2016 | Sogabe | B23Q 11/127 409/135 |
| 2017/0023417 A1* | 1/2017 | Koyama | G05B 19/404 |
| 2017/0091667 A1* | 3/2017 | Yukawa | G05B 19/404 |

\* cited by examiner

DISPLACEMENT ESTIMATION METHOD AND THERMAL DISPLACEMENT CORRECTION METHOD FOR MACHINE TOOL

This application claims the benefit of Japanese Patent Application Number 2016-249626 filed on Dec. 22, 2016, the entirety of which is incorporated by reference.

BACKGROUND OF THE INVENTION

Field of the Invention

The present invention relates to a method for estimating, in a machine tool, a temperature of a portion of which the temperature cannot be directly detected by temperature detection means such as a temperature sensor, and a method for correcting thermal displacement according to the estimated temperature.

Description of the Background Art

In a case where machining is performed by using a machine tool, thermal deformation may be caused in components of the machine tool due to, for example, mechanical heat generation by, for example, spindle and feed shaft operations, and due to temperature change of an environment in which the machine tool is installed, or temperature change of a coolant. Such thermal displacement may cause a relative position between a tool and a workpiece to be changed. Therefore, if thermal displacement occurs in the machine tool during machining, machining accuracy for the workpiece may be degraded.

In the machining, a coolant is used in many cases. In a case where a coolant is used, large displacement occurs, in some cases, due to rapid temperature change caused by difference in temperature between the coolant and the workpiece or a structure when discharging is started. Meanwhile, in a case where the discharging of the coolant is stopped, rapid temperature change occurs due to heat of vaporization generated by vaporization of water from the surface of the workpiece or the structure. Due to these influences, large displacement may occur when the machining is restarted.

As a method for inhibiting thermal displacement of a machine tool, thermal displacement correction in which temperature sensors are attached to the components of the structure of the machine tool, a displacement is calculated on the basis of the measured temperatures, and the shaft moving distance is changed according to the displacement, is widespread. However, a machine tool has many rotary portions and movable portions, and measurement of temperatures is difficult in many portions due to restriction by wiring and the like. Further, it is difficult to directly measure temperatures of a workpiece and a tool that are attached to or detached from the machine tool. Therefore, a method in which correction is performed according to a temperature of a portion of which the temperature is easily measured, instead of a portion of which the temperature is difficult to measure, may be used. However, temperatures are different at different portions. Therefore, accuracy for estimating thermal displacement is reduced, and a correction error may be increased. Further, the portion of which the temperature is difficult to measure, is a portion which is likely to be influenced by a coolant in many cases, whereby the correction error tends to be further increased.

In order to address the aforementioned problem, Japanese Patent No. 3897884 (hereinafter, referred to as Patent Literature 1) discloses a technique in which a temperature simulation block is provided in a turret head which is a rotary portion and at which attaching of a temperature sensor is difficult, and the temperature of the turret head is indirectly measured by using the temperature simulation block. The temperature simulation block is designed so as to have a heat capacity close to that of the turret head, and a coolant which has not yet been ejected is brought into thermal contact with the temperature simulation block. Patent Literature 1 indicates that, by utilizing the temperature of the temperature simulation block, thermal displacement can be accurately estimated.

Japanese Laid-Open Patent Publication No. 2002-301637 (hereinafter, referred to as Patent Literature 2) discloses a technique in which, for estimating thermal displacement of a spindle, coefficients are used so as to be different between a case where a coolant is used and a case where no coolant is used, and, when a coolant is used, the coefficient is adjusted according to a difference in temperature between the spindle and the coolant, to correct an error due to influence of the coolant.

Japanese Laid-Open Patent Publication No. 2002-326141 (hereinafter, referred to as Patent Literature 3) discloses a technique in which the tendency of temperature change of a coolant is determined, and a filter coefficient is changed between a case where the temperature rises, and a case where the temperature reduces, whereby the temperature, of a structure, influenced by a coolant is accurately estimated.

However, the method disclosed in Patent Literature 1 is performed on the assumption that machining is performed with the use of a coolant. In a case where machining is performed without using a coolant, difference in temperature between the turret head and the temperature simulation block is increased due to difference in ambient environment, and a correction error may be increased. Further, when machines are changed and the size of the turret head is changed, the temperature simulation block needs to be also changed according to the size of the turret head, and labor and time may be increased in designing and manufacturing of the machine tool.

In the method disclosed in Patent Literature 2, a coefficient is changed between a case where a coolant is used and a case where no coolant is used, to estimate thermal displacement of a spindle. Therefore, this method can be used for both a case where a coolant is used and a case where no coolant is used. However, it is difficult to use this method in practice in some points.

Patent Literature 2 indicates that the coefficient is adjusted according to difference in temperature between the spindle and a coolant, and the adjusting method is determined on the basis of an experiment. However, it may be difficult to simply adjust a coefficient based on the difference in temperature between the spindle and the coolant in practice. For example, even if difference in temperature is the same between a case where the temperature of the spindle is high, and the temperature of the coolant is close to room temperature, and a case where the temperature of the spindle is not high, and the temperature of the coolant is lower than room temperature, the influence may be different. In this case, thermal displacement needs to be measured for various temperatures of the spindle and various temperatures of the coolant, to determine the coefficients, and a large amount of experimental data is necessary. Further, Patent Literature 2 discloses a method for improving, in a transient state, change after use of a coolant is ended, but does not provide description about change after start of discharging.

In the method disclosed in Patent Literature 3, difference between a case where a coolant is used and a case where no coolant is used, is not considered, and a correction error may be increased in a case where no coolant is used.

Each of the methods disclosed in Patent Literature 2 and Patent Literature 3 cannot address rapid change that occurs in a case where difference in temperature between a workpiece or a structure, and a coolant at the start of the discharging is large.

Therefore, an object of the present invention is to provide a temperature estimation method, for a machine tool, in which a temperature of a portion of which the temperature is difficult to directly measure is accurately estimated in a simple manner, and a thermal displacement correction method which is performed on the basis of the estimated temperature.

SUMMARY OF THE INVENTION

In order to attain the aforementioned object, a first aspect of the present invention is a temperature estimation method, for a machine tool, for estimating, in a machine tool having a plurality of portions to which temperature sensors, respectively, are attached, and a portion to which the temperature sensor is not attached, a temperature of the portion to which the temperature sensor is not attached. The temperature estimation method may comprise a temperature information obtaining step, an operation information obtaining step, a coefficient determination step and a temperature estimation step. The temperature information obtaining step is a step of obtaining temperature information from the temperature sensors at two or more difference portions to which the temperature sensors are attached. The operation information obtaining step is a step of obtaining predetermined operation information represented by two kinds of states that are ON and OFF. The coefficient determination step is a step of determining a coefficient for each piece of the temperature information such that, when a time when the operation information is switched from ON to OFF, or from OFF to ON is a reference time, the coefficient for each piece of the temperature information is changed according to a time that elapses from the reference time. The temperature estimation step is a step of estimating a temperature of the portion to which the temperature sensor is not attached, on the basis of the temperature information and the coefficient for the temperature information.

The "portion to which the temperature sensors are attached" and the "portion to which the temperature sensor is not attached" include a space, such as a machining space, in the machine tool.

In a second aspect of the present invention based on the first aspect, in the coefficient determination step, the operation information may be represented by a flag, one or more time constants may be preset, and lag process may be performed for the flag by using the time constant, to determine the coefficient for each piece of the temperature information at any point of time.

In a third aspect of the present invention based on the second aspect, a value of the time constant may be different between a time when the operation information is switched from ON to OFF, and a time when the operation information is switched from OFF to ON.

In a fourth aspect of the present invention based on the first aspect, a coolant is able to be used for the machine tool, and the temperature information includes a temperature of a structure or a machining space of the machine tool, and a temperature of the coolant, and the operation information represents discharging or stopping of the coolant.

In the fourth aspect, in the coefficient determination step, when a time when discharging of the coolant is changed to stopping of the coolant or a time when stopping of the coolant is changed to discharging of the coolant is a reference time, a coefficient for the temperature information may be determined for each of the temperature of the structure or the machining space and the temperature of the coolant such that the coefficient for the temperature information is changed according to a time that elapses from the reference time, and in the temperature estimation step, a temperature of the portion to which the temperature sensor is not attached may be estimated on the basis of the temperature of the structure or the machining space, the temperature of the coolant, and the coefficient for the temperature information.

In a fifth aspect of the present invention based on the fourth aspect, in the coefficient determination step, the number of the time constants that are preset may be two, and the coefficient for the temperature information may be determined by performing lag process, for the flag, by using the time constants, and, in the temperature estimation step, by multiplying, by a predetermined coefficient, a difference between the two time constants by which the lag process is performed, a temperature change due to heat of vaporization after stopping of the coolant may be estimated, and a temperature of the portion to which the temperature sensor is not attached may be estimated in consideration of the temperature change.

In a sixth aspect of the present invention based on the fifth aspect, a hygrometer may be set around the structure or in the machining space, and the time constants and/or the predetermined coefficient may be changed according to a humidity measured by the hygrometer.

In a seventh aspect of the present invention based on the first aspect, the machine tool includes a heating device capable of heating a workpiece to perform machining or perform heat treatment, the temperature information includes a temperature of a structure or a machining space of the machine tool, and a heating temperature for the workpiece, and the operation information represents operation or stopping of the heating device.

In the seventh aspect, in the coefficient determination step, when a time when the heating device is switched from operation to stopping, or a time when the heating device is switched from stopping to operation is a reference time, a coefficient for the temperature information may be determined for each of the temperature of the structure or the machining space, and the heating temperature such that the coefficient for the temperature information is changed according to a time that elapses from the reference time, and in the temperature estimation step, a temperature of the portion to which the temperature sensor is not attached may be estimated on the basis of the temperature of the structure or the machining space, the heating temperature, and the coefficient for the temperature information.

In an eighth aspect of the present invention based on the second aspect, the time constant may be set according to at least one of a workpiece, a tool, a jig, and tooling.

In order to attain the aforementioned object, a ninth aspect of the present invention is a thermal displacement correction method, for a machine tool, for correcting, in a machine tool having a plurality of portions to which temperature sensors, respectively, are attached, and a portion to which the temperature sensor is not attached, thermal displacement of the portion to which the temperature sensor is not attached. The thermal displacement correction method may comprise a portion-having-no-sensor temperature estimation step, a thermal displacement calculation step and a correction step. The portion-having-no-sensor temperature estimation step is a step of estimating a temperature of the portion to which the temperature sensor is not attached, by using the temperature estimation method according to the first aspect. The thermal displacement calculation step is a step of calculating a thermal displacement amount by using the estimated temperature. The correction step is a step of correcting a cutter edge position of a tool, on the basis of the calculated thermal displacement amount.

According to the present invention, a temperature of a portion of which the temperature is difficult to directly measure and to which the temperature sensor is not attached can be accurately estimated in a simple method, on the basis of a result of temperature measurement at a portion to which the temperature sensor is attached.

In particular, by using information about operations which are represented as two kinds of states that are ON/OFF, a process of obtaining coefficients for temperatures at two or more different positions so as to change the coefficients according to a time that has elapsed from a reference time at which the state is switched is performed. Therefore, the temperature to be used can be changed so as to be different between the operation state of ON and the operation state of OFF. Further, at a time when the state is switched, the estimated temperature does not abruptly change but smoothly changes.

In the machine tool, the estimated temperature of a portion to which the temperature sensor is not attached is used to calculate a thermal displacement amount, whereby accuracy for thermal displacement correction, that is, accuracy for machining can be enhanced.

According to the second aspect of the present invention, in addition to the aforementioned effects being obtained, the operation information is represented by a flag, and a time constant is set, and the flag is subjected to lag process, to obtain a coefficient for the temperature. Therefore, the tendency of temperature change in the case of the operation state being changed can be expressed by a parameter that is a time constant, and the calculation expression can be represented in a simple form. Therefore, a parameter adjustment for accurately estimating actual temperature change is facilitated.

According to the third aspect of the present invention, in addition to the aforementioned effects being obtained, the value of the time constant is made different between change from ON to OFF, and change from OFF to ON. Therefore, the temperature can be accurately estimated in each case.

According to the fourth aspect of the present invention, in addition to the aforementioned effects being obtained, information about the coolant discharging/stopping state is used so as to be adapted for temperature change due to influence of the coolant, whereby the temperature can be estimated regardless of whether or not the coolant is used. Further, both the temperature of the coolant and the temperature of the structure are used, thereby also addressing a state where difference between both the temperatures is great when the discharging of the coolant is started.

Further, a time when discharging of the coolant is changed to stopping of the coolant and a time when stopping of the coolant is changed to discharging of the coolant, are each set as a reference time, and a process of changing the coefficients of the structure temperature and the coolant temperature over time is performed. Therefore, at a time when the state is changed, the estimated temperature does not abruptly change but smoothly changes. By the aforementioned effects, large temperature change in a transient state after the state of the coolant is changed from discharging state to stopping state or changed from stopping state to discharging state can be also addressed.

According to the fifth aspect of the present invention, in addition to the aforementioned effects being obtained, in order to address abrupt reduction of temperature due to heat of vaporization which occurs in the case of the coolant being stopped, when two time constants and coefficients are appropriately set, temperature change due to heat of vaporization can be accurately estimated.

According to the sixth aspect of the present invention, in addition to the aforementioned effects being obtained, even when an amount of the heat of vaporization is changed due to an ambient humidity, or influence of opening/closing of an operation door, humidity in the machining space or the like is monitored by using a hygrometer, and the parameter is changed according thereto. Therefore, the influence of the heat of vaporization can be accurately estimated even if the environment is changed.

According to the seventh aspect of the present invention, in addition to the aforementioned effects being obtained, temperature change due to influence of a heating device such as laser is addressed, and, therefore, both a heating temperature and a temperature of the structure or the machining space are used, and the coefficients for the heating temperature and the temperature of the structure or the machining space can be changed over time on the basis of the reference time at which stopping is changed to heating or at which heating is changed to stopping. Thus, the estimated temperature does not abruptly change at a time when the state is switched, but smoothly changes. By the aforementioned effects, large temperature change in a transient state after change from stopping to heating or change from heating to stopping can be addressed. Further, when the tendency of temperature change in the case of the heating device being used is expressed by a parameter that is a time constant, the calculation expression can be represented in a simple form, and, also when, for example, a workpiece to be machined is changed, a parameter adjustment for accurately estimating actual temperature change is facilitated.

According to the eighth aspect of the present invention, by setting the time constant according to a kind of a workpiece, a tool, or the like, the temperature change thereof can be estimated. Even when the workpiece, the tool, or the like is changed, the temperature change can be accurately estimated.

DESCRIPTION OF THE PREFERRED EMBODIMENTS

Hereinafter, an embodiment of the present invention will be described with reference to the drawings.

Figure 1:
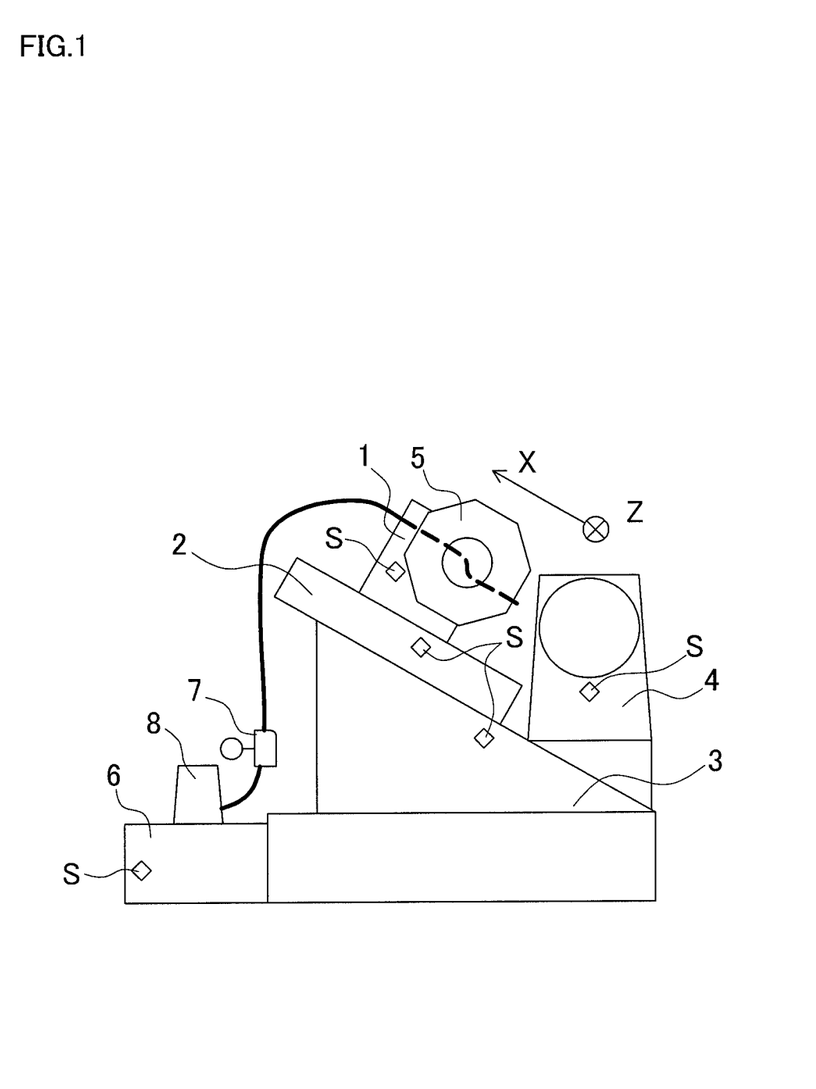
FIG. 1 is a schematic diagram illustrating an NC lathe.

FIG. 1 illustrates an NC lathe that is an example of a machine tool. Needless to say, the present invention is also applicable to other types of machine tools such as a machining center and a combined machining tool.

The NC lathe shown in FIG. 1 includes a cutting tool holder 1, a saddle 2, a bed 3 that is a base, and a headstock 4. Temperature sensors S, S, . . . are attached to each of the cutting tool holder 1, the saddle 2, the bed 3, and the headstock 4 (portions to which the temperature sensors are attached). Further, the cutting tool holder 1 has a turret 5 mounted thereto, and the turret 5 has a plurality of tools previously mounted thereto, and can rotate to change a tool to be used. The temperature sensor is not attached to the turret 5 (portion to which the temperature sensor is not attached). This is because the turret 5 is a rotary portion and wiring is difficult for a standard temperature sensor.

Further, a coolant tank 6 is disposed lateral to the bed 3, and the temperature sensor S for measuring the temperature of a coolant is mounted inside the coolant tank 6. Further, in piping from the coolant tank 6 to the cutting tool holder 1, a flow rate sensor 7 is mounted, and a signal for discharging/stopping of a coolant pump 8 provided in the coolant tank 6 is transmitted to a not-illustrated NC device.

The temperature sensor for measuring the coolant may be disposed in another portion, in the piping or the like, which is sensitive to influence of change of the temperature of the coolant, instead of the temperature sensor being provided inside the coolant tank 6. Further, as a method for obtaining a signal for discharging/stopping of the coolant, for example, not only a method for obtaining a signal from the flow rate sensor 7 provided in the piping as shown in FIG. 1, but also a method for reading, from the NC device, a command value to the coolant pump 8, or a method for causing a sensor to detect rotation of the coolant pump 8, may be used.

Next, a method for estimating, in the NC lathe shown in FIG. 1, a temperature of the turret 5 to which the temperature sensor is not attached, will be described on the basis of the theory of heat transfer.

Firstly, temperature change in the case of discharging of a coolant being started, will be described.

When a relationship between the temperature change of the turret 5 and heat exchange which is performed between the turret 5 and the coolant is represented as a differential equation where $\theta_t$ represents the temperature of the turret 5, and $\theta_C$ represents the temperature of the coolant, the following expression (1) is obtained.

[Numerical expression 1]

$$\rho C V \frac{d\theta_1}{dt} = h_c A(\theta_c - \theta_t) \quad (1)$$

In expression (1), $\rho$, C, and V represent the density, the specific heat, and the volume, respectively, of the turret 5. Further, $h_C$ represents a heat transfer coefficient of heat transfer between the coolant and the turret 5, and A represents the surface area of the turret 5. Expression (1) can be rewritten as the following expressions (2) and (3) where $T_C$ represents a temperature change time constant for the coolant.

[Numerical expression 2]

$$T_c \frac{d\theta_t}{dt} = \theta_c - \theta_t \quad (2)$$

$$T_c = \rho C V / h_c A \quad (3)$$

By the differential equation (2) being solved, the turret temperature $\theta_t$ in the case of the turret being subjected to the coolant can be obtained. The form of the solution of the differential equation is assumed as the following expression (4) ($C_1$, $C_2$, $C_3$: constant).

[Numerical expression 3]

$$\theta_t = C_1 e^{C_2 t} + C_3 \quad (4)$$

When expression (4) is substituted for expression (2), $C_2$ and $C_3$ are obtained, and the following expression (5) is obtained.

[Numerical expression 4]

$$\theta t = C_1 e^{-t/Tc} + \theta_c \quad (5)$$

A time at which discharging of the coolant is started is represented as t=0, and it can be assumed that a turret temperature $\theta_t(0)$ before discharging of the coolant is equal to the machining chamber temperature $\theta_{air}$ represented by the following expression (6).

[Numerical expression 5]

$$\theta_t(0) = C_1 + \theta_c = \theta_{air} \quad (6)$$

Therefore, $C_1 = \theta_{air} - \theta_C$ is satisfied, and, when this is substituted for expression (5), the following expression (7) is obtained.

[Numerical expression 6]

$$\theta_t(\theta_{air} - \theta_c)e^{-t/Tc} + \theta_c \quad (7)$$

Further, when the expression is rewritten, the following expressions (8) to (10) are obtained.

[Numerical expression 7]

$$\theta_t = p_c \theta_c + p_{air} \theta_{air} \quad (8)$$

$$p_c = 1 - e^{-t/Tc} \quad (9)$$

$$p_{air} = 1 - (1 - e^{-t/Tc}) \quad (10)$$

When the discharging of the coolant is represented by a step input (change from 0 that represents stopping to 1 that represents discharging), a coefficient $p_C$ of $\theta_C$ is equal to a response of a first-order lag of a time constant $T_C$ in the case of the coolant temperature being an input. Meanwhile, a coefficient $p_{air}$ of $\theta_{air}$ can be expressed as $1 - p_C$. Thus, it is found that a coolant discharging state is represented by a flag, the flag is subjected to the first-order lag process, and the flag subjected thereto is set as a coefficient, whereby the temperature change in the case of the turret being subjected to the coolant can be simulated.

In expression (6) to expression (8), the machining chamber temperature $\theta_{air}$ is used. However, also when, instead thereof, a machine body temperature $\theta_m$ is used, the same calculation can be performed.

Next, a case where the discharging of the coolant is stopped will be described. At this time, the differential equations represented by the following expressions (11) and (12) are satisfied, where $\theta_t$ represents the temperature of the turret 5, and $\theta_{air}$ represents the temperature of a machining space.

[Numerical expression 8]

$$T_{air}\frac{d\theta t}{dt} = \theta_{air} - \theta_t + \frac{Q(t)}{h_{air}A} \quad (11)$$

$$T_{air} = pCV/h_{air}A \quad (12)$$

The temperature change of the turret in the case of the coolant being stopped, is influenced by a heat transfer coefficient $h_{air}$ of heat transfer between air in the machining space and the turret, and is thus represented by using a time constant $T_{air}$ which is different from the time constant for discharging. Further, Q(t) in expression (11) is a function that represents heat of vaporization. On the basis of experience, the heat of vaporization is assumed as follows.

$$Q(t)/h_{air}A = -K_0 e^{-t/T_v}$$

The influence of heat of vaporization at t=0 (immediately after the coolant is stopped) is $-K_0$, and an amount of heat that is removed per unit time becomes close to 0 at the rate of a time constant $T_V$ as vaporization of water from the surface of the turret is reduced. It is assumed that the constants $K_0$ and $T_V$ are changed according to an amount of water on the turret 5, the kind of the coolant, humidity, and the like.

By substitution for a differential equation, the following expression (13) is obtained.

[Numerical expression 9]

$$T_{air}\frac{d\theta t}{dt} = \theta_{air} - \theta_t + K_0 e^{-t/T_v} \quad (13)$$

The form of the solution of the differential equation is assumed as the following expression (14) ($K_1$, $K_2$, $K_3$: constant).

[Numerical expression 10]

$$\theta_t = K_1 e^{-t/T_{air}} + K_2 e^{-t/T_v} + K_3 \quad (14)$$

When expression (14) is substituted for expression (13), expressions (15) and (16) that are the expressions for the constants are obtained.

[Numerical expression 11]

$$K_2 = -\frac{T_2}{T_2 - T_1} K_0 \quad (15)$$

$$K_3 = \theta_{air} \quad (16)$$

A time at which the coolant is stopped is represented as t=0, and it is assumed that the turret temperature θt before the coolant is stopped, is equal to the coolant temperature $\theta_C$ as indicated in the following expression (17). $K_1$ is determined, and expression (18) is obtained.

[Numerical expression 12]

$$\theta_t(0) = K_1 + K_2 + K_3 = \theta_c \quad (17)$$

$$K_1 = \theta_c - \theta_{air} + \frac{T_v}{T_v - T_{air}} K_0 \quad (18)$$

Thus, the solution of the differential equation is the following expression (19), and, when the expression is rewritten so as to be simplified, the expression can be expressed as the following expressions (20) to (23).

[Numerical expression 13]

$$\theta_t = \quad (19)$$

$$e^{-t/T_{air}}\theta_c + (1 - e^{-t/T_{air}})\theta_{air} - \frac{T_v}{T_v - T_{air}}K_0(e^{-t/T_v} - e^{-t/T_{air}})$$

$$\theta_t = p'_c \theta_c + p'_{air}\theta_{air} - \alpha(e^{-t/T_v} - e^{-t/T_{air}}) \quad (20)$$

$$p'_c = e^{-t/T_{air}} \quad (21)$$

$$p'_{air} = e^{-t/T_{air}} \quad (22)$$

$$\alpha = \frac{T_v}{T_v - T_{air}}K_0 \quad (23)$$

$e^{-t/T_{air}}$ in expression (21) is a first-order lag in the case of the input being changed from 1 to 0 stepwise. That is, it can be found that, when a coolant discharging state is represented by using a flag such that the flag represents 0 for stopping of the coolant and the flag represents 1 for the discharging of the coolant, the coefficient of the coolant can be represented as a first-order lag of the flag, similarly in the case of discharging of the coolant. Further, the coefficient $p'_{air}$ of $\theta_{air}$ in the second term can be represented as $1-p'_C$, similarly in the case of the discharging.

The relevant time constants are the time constant $T_C$ in the case of the coolant temperature being input, for discharging, and the time constant $T_{air}$ in the case of the machining space temperature being input, for stopping. In general, in a case where input is liquid, heat is more easily transferred, and temperature change is accelerated, and the time constant is reduced as compared to a case where input is gas. Therefore, it can be found that a time constant is preferably different between a process in discharging and a process in stopping.

In expression (20), the first term and the second term are almost the same as those in discharging. When the coolant is stopped, the third term is added due to influence of heat of vaporization. The third term is obtained by multiplying, by a certain coefficient α, a difference in step response between the two time constants (time constant $T_{air}$ of the turret with respect to the machining space temperature, and time constant $T_V$ representing reduction of heat of vaporization).

Thus, the coolant discharging state is represented by using a flag such the flag represents 0 for stopping of the coolant and the flag represents 1 for discharging of the coolant. A first-order lag response is obtained for three time constants (the time constant $T_C$ of the turret with respect to a coolant temperature, the time constant $T_{air}$ of the turret with respect to a machining space temperature, the time constant $T_V$ that represents reduction of heat of vaporization) in the case of the flag being input, and multiplication by the coolant temperature $\theta_C$, and the machining space temperature $\theta_{air}$ or the machine body temperature $\theta_m$ is performed, whereby both temperature change at the discharging and the temperature change at the stopping in consideration of heat of vaporization can be represented.

Figure 2:
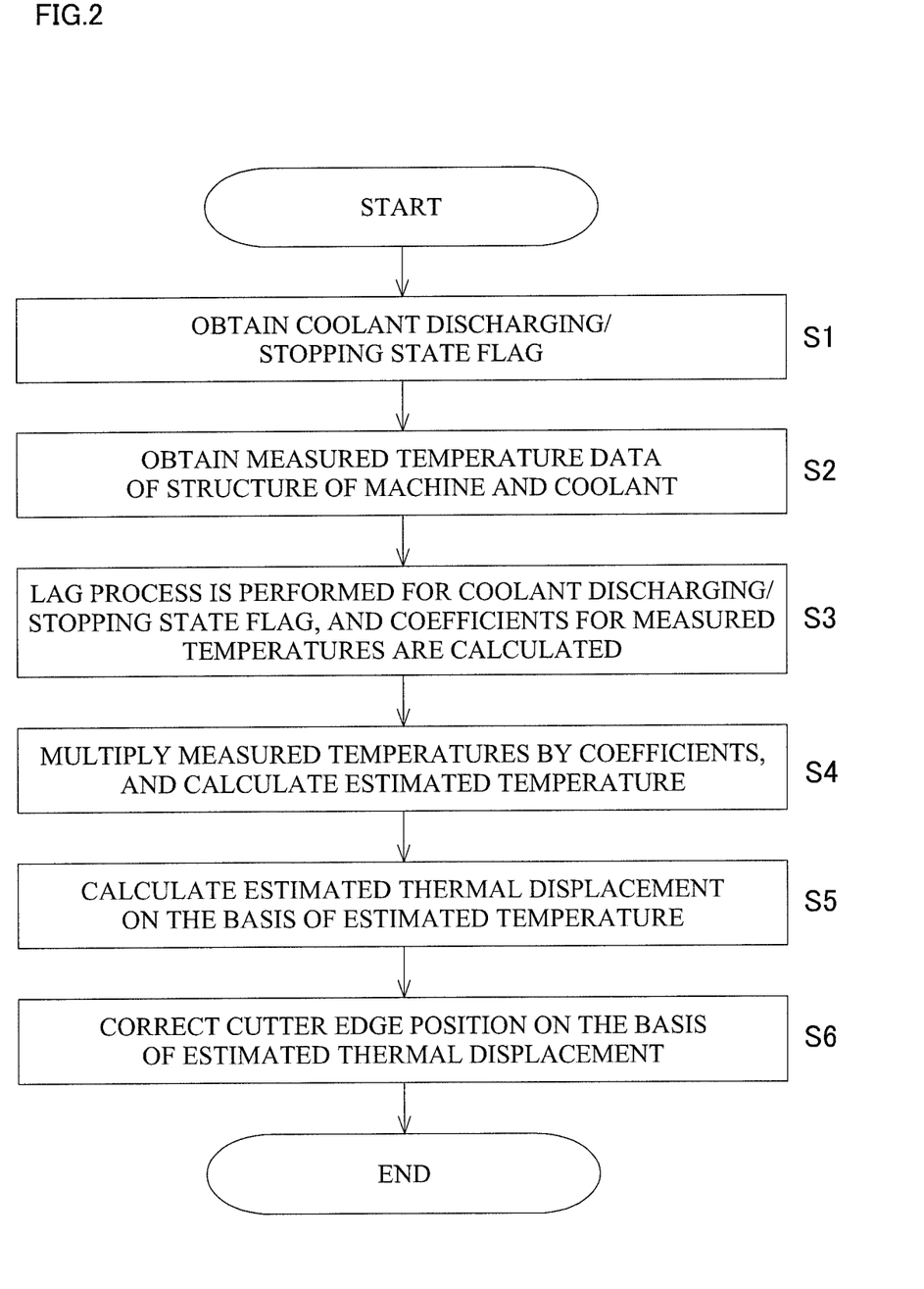
FIG. 2 is a flow chart showing temperature estimation and thermal displacement correction.

FIG. 2 shows the above contents as a flow chart. In the present embodiment, according to the process flow shown in FIG. 2, the NC device estimates the temperature of the turret 5 on the basis of signals from the temperature sensors S and the coolant pump 8 (S1 to S4: portion-having-no-sensor temperature estimation step), and performs thermal displacement correction for a cutter edge position on the basis of the estimated temperature of the turret 5.

Firstly, information about a coolant discharging/stopping state is obtained (S1: operation information obtaining step). As the information about the coolant discharging/stopping state, a flag is used such that the flag represents 1 for the discharging state and the flag represents 0 for the stopping state.

Next, measured temperature data is obtained from the temperature sensors S provided in the components of the machine tool, the machining space, and the coolant tank 6 (S2: temperature information obtaining step).

Next, lag process is performed for the coolant discharging/stopping state flag, and coefficients for measured temperatures of the coolant and the machine structure (the cutting tool holder 1 in the present embodiment) are calculated (S3: coefficient determination step).

Next, the measured temperatures are multiplied by the coefficients, and an estimated temperature (estimated temperature of the turret 5 in the present embodiment) of a portion to which the temperature sensor is not attached is calculated (S4: temperature estimation step).

Next, an estimated thermal displacement is calculated by using the estimated temperature obtained in S4 (S5: thermal displacement calculation step). As the estimated thermal displacement, for example, an estimated thermal displacement $X_C$ at the cutter edge is calculated in the NC lathe shown in FIG. 1 according to the following expression (24) where $\Theta_0$ represents the estimated turret temperature, $\theta_1$ represents the measured cutting tool holder temperature, $\theta_2$ represents the measured saddle temperature, $\theta_3$ represents the measured bed temperature, $\theta_4$ represents the measured headstock temperature, and $C_0$ to $C_4$ represent coefficients for the respective temperatures.

[Numerical expression 14]

$$X_c = C_0\Theta_0 + C_1\theta_1 + C_2\theta_2 + C_3\theta_3 + C_4\theta_4 \quad (24)$$

In S6, the thermal displacement correction is performed such that the cutter edge position is changed by the estimated thermal displacement $X_C$ calculated in S5 (correction step).

Thus, the thermal displacement that occurs due to the temperature change of the machine structure can be effectively inhibited.

Next, a method for calculating the estimated temperature $\Theta_0$ of the turret 5 and the effect thereof will be described by using an example.

Figure 3:
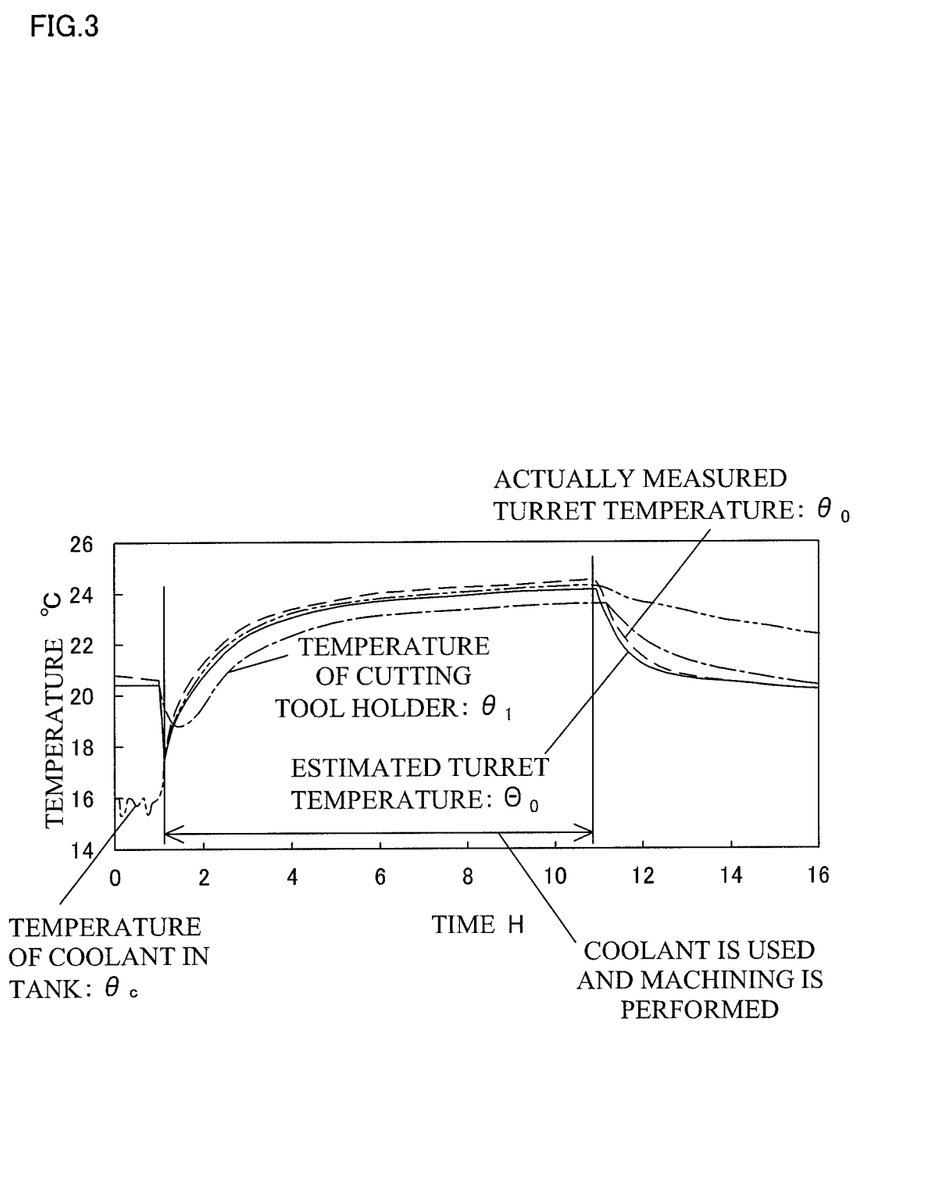
FIG. 3 is a graph showing change of a cutting tool holder temperature, an actually measured turret temperature, a coolant-in-tank temperature, an estimated turret temperature in a certain use condition.

It is assumed that, in a certain use condition, an actually measured turret temperature $\theta_0$, a cutting tool holder temperature $\theta_1$, and the coolant temperature $\theta_C$ are changed as shown in FIG. 3. In the machining, machining is performed with the use of the coolant after one hour has elapsed until elapse of eleven hours, and, at times other than the aforementioned times, the machining is stopped and discharging of the coolant is also stopped. Before the machining is started, the temperature of the coolant is lower than the temperatures of the turret 5 and the cutting tool holder 1 by about 5° C. The difference in temperature between the machine and the coolant occurs, for example, in a case where a portion near a floor is cooled, for example, in the early morning in winter, or in a case where the coolant is supplied. When the discharging is started in this state, the temperatures of the turret 5 and the cutting tool holder 1 are lowered by the turret 5 and the cutting tool holder 1 being subjected to the coolant which is cooled, whereas the temperature of the coolant rapidly rises by heat from the machine.

Within 20 to 30 minutes from the start of the discharging, the temperature of the coolant and the temperature of the machine become almost equal to each other, and heat by machining and heat generated by the coolant pump 8 are thereafter transferred to the coolant, whereby the coolant temperature $\theta_C$ in the coolant tank 6 gently rises. Simultaneously, the actually measured turret temperature $\theta_0$ and the cutting tool holder temperature $\theta_1$ also rise. Meanwhile, in a case where the machining is stopped, each temperature is lowered.

Figure 4:
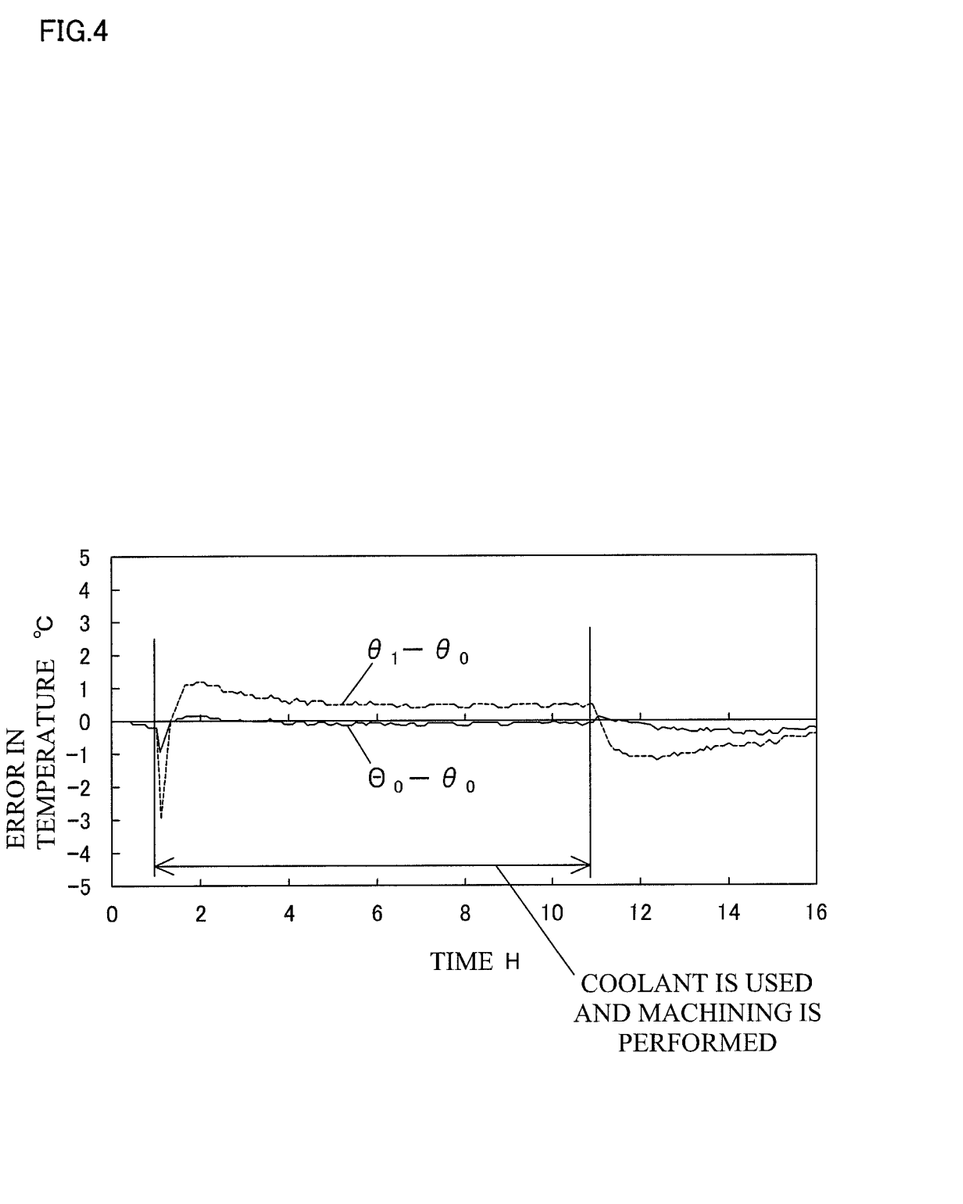
FIG. 4 is a graph showing an estimation error of the temperature of a turret in each of the case of an estimated temperature being obtained and the case of a substitute temperature being used.

Further, the actually measured turret temperature $\theta_0$ is changed more sensitively than the cutting tool holder temperature $\theta_1$ due to difference in heat capacity between the turret 5 and the cutting tool holder 1, and due to difference in a manner in which the coolant is applied, and difference occurs between the temperatures $\theta_0$ and $\theta_1$ as indicated by a broken line in the graph shown in FIG. 4. Therefore, in a case where the cutting tool holder temperature instead of the temperature of the turret 5 is used to perform the thermal displacement correction, the correction error may occur due to the influence of the difference in temperature. When a method for calculating an estimated temperature is changed according to the coolant discharging/stopping state, to calculate the estimated temperature $\Theta_0$ of the turret 5, the error can be reduced.

A specific method for calculating the estimated temperature $\Theta_0$ is as follows. That is, according to the process flow in FIG. 2, firstly, the cutting tool holder temperature $\theta_1$ in a portion near the turret 5, and the coolant temperature $\theta C$ are obtained as temperature information. Further, the information about the coolant discharging/stopping state is obtained as a flag u that represents 1 for the discharging state, and represents 0 for the stopping state.

Further, for the flag, lag process is performed, and coefficients $q_1$, $q_2$, a coefficient $p_1$ for the cutting tool holder temperature, and the coefficient $p_C$ for the coolant temperature are calculated. $\Delta_t$ represents time intervals at which data is obtained, (n) represents the present value, (n−1) represents a value at the immediately preceding sampling, and k represents a rate in the case of a sufficient time having elapsed after changing of a value of the flag. The method for calculating the estimated temperature $\Theta_0$ is represented by the following expressions (25) to (27). These expressions are represented in the form of difference equations on the basis of expressions (8) to (10) and expressions (20) to (23).

[Numerical expression 15]

$$q_1(1) = 0, \; q_2(1) = 0$$

$$q_1(n) = q_1(n-1) + \frac{\Delta t}{\Delta t + T_1}\{u(n) - q_1(n-1)\}$$

$$q_2(n) = q_2(n-1) + \frac{\Delta t}{\Delta t + T_2}\{u(n) - q_2(n-1)\}$$

$$u(n) = \begin{cases} 1: & \text{discharging of coolant} \\ 0: & \text{stopping of coolant} \end{cases}$$

$$T_1 < T_2 \quad (25)$$

$$P_c(n) = kq_1(n) \quad (26)$$

$$p_1(n) = 1 - kq_1(n)$$

$$0 \leq k \leq 1$$

$$\Theta_0(n) = p_c(n)\theta_c(n) + p_1(n)\theta_1(n) - \alpha\{q_1(n) - q_2(n)\} \quad (27)$$

In expression (25), a first-order lag filtering in the case of $T_1$, $T_2$ representing time constants is performed for the flag u (n) representing the coolant discharging state. In the present embodiment, a first-order lag digital filter is used. However, the lag process may be performed in another method.

In expression (26), the coefficient obtained by expression (25) is multiplied by the rate k, to calculate the coefficient $p_C$ for the coolant temperature. Further, expression (26) represents a condition that the sum of the coefficients for the respective temperatures is 1. The coefficients for the respective temperatures are determined so as to satisfy the condition in general such that the scale for the measured temperature and the scale for the estimated temperature conform to each other. Expression (26) represents an example in which two temperatures are used to perform estimation. However, three or more temperatures may be used to obtain an estimated temperature when the coefficients for the respective temperatures are determined so as to satisfy the condition that the sum is 1.

Figure 5:
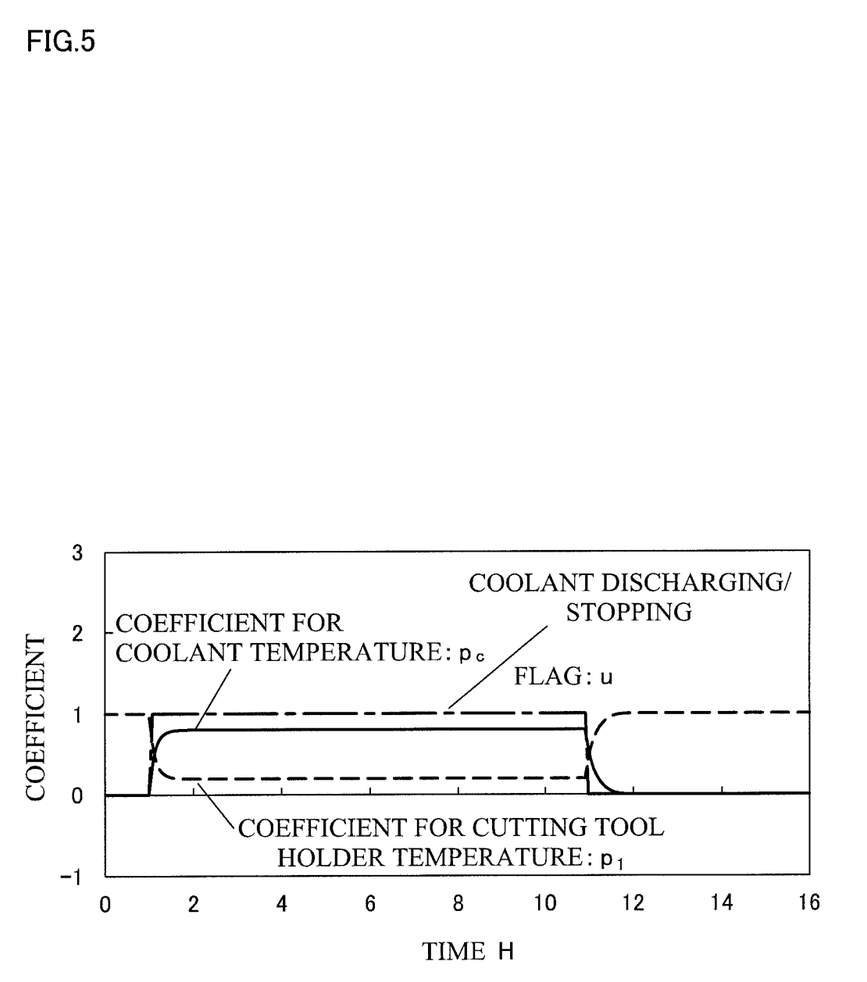
FIG. 5 is a graph showing a coefficient for each of a cutting tool holder temperature and a coolant temperature in the case of a first-order lag process being performed for coolant discharging/stopping, and a coefficient for each temperature being changed.

FIG. 5 shows a graph expressed by using the flag u representing the coolant discharging/stopping state, and the coefficient $p_C$ for the coolant temperature and the coefficient $p_1$ for the cutting tool holder temperature, which are calculated by expressions (25) to (26). As can be seen from the graph, when the coolant is not discharged, that is, when u=0 is satisfied, $p_C$ approaches 0 so as to satisfy $p_C$=0, and $p_1$ approaches 1 so as to satisfy $p_1$=1, and the estimated temperature $\Theta_0$ of the turret 5 is equal to the cutting tool holder temperature $\theta_1$.

Meanwhile, when a sufficient time has elapsed after discharging of the coolant, the value of $p_C$ becomes equal to k, and the value of $p_1$ becomes equal to 1–k. k represents a constant ranging from 0 to 1, and is preset according to, for example, the result of experiments. In general, k is a value close to 1. Therefore, the estimated temperature $\Theta_0$ of the turret 5 is a value close to the coolant temperature $\theta_C$ in the case of the coolant being used.

Further, when switching between the coolant discharging state and the coolant stopping state occurs, that is, when the value of the flag u is changed, the coefficient $p_C$ is changed such that the greater the value of the time constant $T_1$ is, the greater the lag with respect to the change of the flag u is. Thus, rapid change can be prevented from occurring at the switching time. The time constant $T_1$ may constantly take the same value. However, when the time constant $T_1$ is made different between the discharging and the stopping, estimation can be performed with enhanced accuracy. Examples of a method for determining the time constant $T_1$ include a method in which analysis is previously performed in designing, and an obtained result is inputted and a method in which fitting is performed on the basis of the result of an experiment.

In expression (26), a linear sum of the temperatures is obtained by using the coefficients obtained in expression (25), and, further, a correction term in consideration of heat of vaporization is subtracted, thereby calculating the estimated temperature. The correction term is calculated by filtering being performed with the two time constants to obtain a difference therebetween.

When the estimated temperature $\Theta_0$ of the turret 5 is obtained in the above-described method, a black solid line shown in FIG. 3 is obtained. This indicates that the estimated temperature $\Theta_0$ of the turret 5 follows well the actually measured turret temperature $\theta_0$ over the entirety. Further, when a difference between the estimated temperature $\Theta_0$ of the turret 5 and the cutting tool holder temperature $\theta_1$ is obtained, a black solid line shown in FIG. 4 is obtained. The comparison between this result and the $\theta_1 - \theta_0$ represented by the broken line indicates that, in a case where the coolant temperature is used when the coolant is discharged, a temperature estimation error is greatly reduced.

Further, also at a time when the state of the coolant is switched between the coolant discharging state and the coolant stopping state, the change is not abrupt but smooth. It can be understood that the temperature of the machine body is used when the coolant is stopped, and the temperature of the coolant in addition to the temperature of the machine body is used when the coolant is discharged, whereby an error is reduced even when a difference in temperature between the coolant and the machine body occurs in the case of the discharging being started.

Further, when the temperature to be used is momentarily changed, abrupt change occurs. However, this problem can be prevented by the lag process. Further, it can be understood that an error after stopping of the coolant is also greatly reduced, and the temperature can be accurately estimated.

After the coolant is stopped, the actually measured turret temperature $\theta_0$ abruptly changes due to heat of vaporization, and the actually measured turret temperature $\theta_0$ changes faster as compared to the cutting tool holder temperature $\theta_1$ and the coolant temperature $\theta_C$. However, when different time constants are used to perform calculation as indicated in expression (26), reproduction can be performed for abrupt temperature change due to heat of vaporization.

Thus, in the temperature estimation method and the thermal displacement correction method according to the above-described embodiment, a temperature of a portion (in the description herein, the turret 5) of which the temperature is difficult to directly measure and to which the temperature sensor is not attached can be accurately estimated in a simple method, on the basis of a result of temperature measurement at a portion to which the temperature sensor S is attached.

Further, by using information about operations, for the coolant, which are represented as two kinds of states that are ON/OFF (discharging/stopping), a process of obtaining coefficients for temperatures at two or more different positions so as to change the coefficients according to a time that has elapsed from a reference time at which the state is switched is performed. Therefore, the temperature to be used can be changed so as to be different between the operation state of ON and the operation state of OFF. Further, at a time when the state is switched, the estimated temperature does not abruptly change but smoothly changes.

In the machine tool, the estimated temperature of a portion to which the temperature sensor is not attached is used to calculate a thermal displacement amount, whereby accuracy for thermal displacement correction, that is, accuracy for machining can be enhanced.

In particular, in the description herein, the operation information is represented by a flag, and a time constant is set, and the flag is subjected to lag process, to obtain a coefficient for the temperature. Therefore, the tendency of temperature change in the case of the operation state being changed can be expressed by a parameter that is a time constant, and the calculation expression can be represented in a simple form. Therefore, a parameter adjustment for accurately estimating actual temperature change is facilitated.

Further, the value of the time constant is made different between change from discharging of the coolant to stopping of the coolant, and change from stopping of the coolant to the discharging of the coolant. Therefore, the temperature can be accurately estimated in each case.

Further, information about the coolant discharging/stopping state is used so as to be adapted for temperature change due to influence of the coolant, whereby the temperature can be estimated regardless of whether or not the coolant is used. Further, both the temperature of the coolant and the temperature of the structure are used, thereby also addressing a state where difference between both the temperatures is great when the discharging of the coolant is started.

Further, a time when discharging of the coolant is changed to stopping of the coolant and a time when stopping of the coolant is changed to discharging of the coolant, are each set as a reference time, and a process of changing the coefficients of the structure temperature and the coolant temperature over time is performed. Therefore, large temperature change in a transient state after the state of the coolant is changed from discharging state to stopping state or changed from stopping state to discharging state can be also addressed.

In addition, in order to address abrupt reduction of the temperature due to heat of vaporization which occurs in the case of the coolant being stopped, when two time constants and coefficients are appropriately set, temperature change due to heat of vaporization can be accurately estimated.

In the present embodiment, the temperature of the cutting tool holder near the turret, and the temperature of the coolant are used to perform estimation. However, instead of the temperature of the cutting tool holder, the temperature in the machining space may be measured and used for estimation. Further, in order to perform the estimation, a plurality of temperatures may be combined and used. That is, for example, an average of the temperature in the machining space and the temperature of the machine body may be used.

Further, an amount of heat of vaporization is also influenced by humidity in the machining space. Therefore, a method in which the humidity in the machining space as well as the temperature therein can be measured, and one or both of values of $T_2$ in expression (25) and a in expression (27) can be adjusted according to the humidity, to estimate the heat of vaporization with enhanced accuracy, may be considered. For example, when the humidity is high, vaporization is less likely to occur and the influence of heat of vaporization is small, and the value of a may be thus reduced. When the humidity is low, the influence of the heat of vaporization is great, and the value of a may be thus increased. Thus, even when an amount of the heat of vaporization is changed due to an ambient humidity, or influence of opening/closing of an operation door, humidity in the machining space or the like is monitored by using a hygrometer, and the parameter is changed according thereto. Therefore, the influence of the heat of vaporization can be accurately estimated even if the environment is changed.

Further, in the present embodiment, the estimation of the temperature of the turret is described as an example. However, a portion of which the temperature is estimated may be any portion that is influenced by the coolant. For example, the estimation can be performed for a table, a pallet, a jig, a workpiece, a tool, tooling, or the like. At this time, the time constants $T_1$ and $T_2$ in expression (25) may be changed according to a kind of a workpiece or a tool, or the like. In general, when the volume of the workpiece or the tool is large, heat capacity is increased, and the time constant is increased. Therefore, the NC device may be structured such that a temperature change time constant corresponding to the workpiece or the tool can be set as a parameter, and, in a case where the workpiece or the tool mounted to the machine is changed, the parameter corresponding to the kind thereof is read and temperature estimation and the thermal displacement correction are performed. In the method for setting the temperature change time constant, the temperature change time constant may be previously calculated on the basis of the size or the like and inputted. Alternatively, the temperature change time constant may be estimated according to the weight sensor, image information, or the like, and automatically set. Thus, by setting the time constant according to the kind of the workpiece, the tool, or the like, the temperature change thereof can be estimated, and, even when the workpiece, the tool, or the like is changed, temperature change can be accurately estimated.

Further, in the present embodiment, temperature estimation in the case of the coolant being used is described as an example. However, the temperature can be similarly estimated also when the workpiece is heated by laser application or the like. That is, a set temperature of the heating device or the like instead of the temperature of the coolant is used, the change of ON/OFF of the heating device is represented by using a flag, and lag process is performed, whereby temperature change due to influence of heating can be estimated.

Thus, the estimated temperature does not abruptly change at a time when the state is switched, but smoothly changes, and large temperature change in a transient state after change from stopping to heating or change from heating to stopping can be addressed. Further, when the tendency of temperature change in the case of the heating device being used is expressed by a parameter that is a time constant, the calculation expression can be represented in a simple form, and, also when, for example, a workpiece to be machined is changed, a parameter adjustment for accurately estimating actual temperature change is facilitated.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A temperature estimation method, for a machine tool, for estimating, in a machine tool having a plurality of portions to which temperature sensors, respectively, are attached, and a portion having no temperature sensor, a temperature of the portion having no temperature sensor, the temperature estimation method comprising:

a temperature information obtaining step of obtaining respective temperature values from each of at least two temperature sensors at two or more different portions among said portions to which the temperature sensors are attached;

an operation information obtaining step of obtaining operation information represented by ON states and OFF states, each time that the operation information changes from ON to OFF or from OFF to ON being a reference time;

a coefficient determination step of determining respective coefficients for each temperature value, the respective coefficients for each temperature value determined taking into account a time that has elapsed since a most recent reference time, the respective coefficients for each temperature value varying over time, and a sum of the respective coefficients for the temperature values is equal to 1; and a temperature estimation step of estimating a temperature of the portion having no temperature sensor, on the basis of the temperature values and the coefficients for the temperature values.

2. The temperature estimation method, for a machine tool, according to claim 1, wherein, in the coefficient determination step, the operation information is represented by a flag, one or more time constants are preset, and lag process is performed for the flag by using the time constant, to determine the coefficient for each piece of the temperature information at any point of time.

3. The temperature estimation method, for a machine tool, according to claim 2, wherein a value of the time constant is different between a time when the operation information is switched from ON to OFF, and a time when the operation information is switched from OFF to ON.

4. The temperature estimation method, for a machine tool, according to claim 1, wherein
a coolant is able to be used for the machine tool,
the temperature values include a temperature of a structure or a machining space of the machine tool, and a temperature of the coolant,
the operation information represents discharging or stopping of the coolant,
in the coefficient determination step, when a time when discharging of the coolant is changed to stopping of the coolant or a time when stopping of the coolant is changed to discharging of the coolant is a reference time, a coefficient for the temperature value is determined for each of the temperature of the structure or the machining space and the temperature of the coolant such that the coefficients for the temperature values are determined taking into account time that has elapsed since a most recent reference time, and
in the temperature estimation step, a temperature of the portion having no temperature sensor is estimated on the basis of the temperature of the structure or the machining space, the temperature of the coolant, and the coefficients for the temperature values.

5. The temperature estimation method, for a machine tool, according to claim 4, wherein
in the coefficient determination step, the number of the time constants that are preset is two, and the coefficients for the temperature values are determined by performing lag process, for the flag, by using the time constants, and
in the temperature estimation step, by multiplying, by a predetermined coefficient, a difference between the two time constants by which the lag process is performed, a temperature change due to heat of vaporization after stopping of the coolant is estimated, and a temperature of the portion having no temperature sensor is estimated in consideration of the temperature change.

6. The temperature estimation method, for a machine tool, according to claim 5, wherein a hygrometer is set around the structure or in the machining space, and at least one of the time constants and the predetermined coefficient is changed according to a humidity measured by the hygrometer.

7. The temperature estimation method, for a machine tool, according to claim 1, wherein
the machine tool includes a heating device capable of heating a workpiece to perform machining or perform heat treatment,
the temperature values include a temperature of a structure or a machining space of the machine tool, and a heating temperature for the workpiece,
the operation information represents operation or stopping of the heating device,
in the coefficient determination step, when a time when the heating device is switched from operation to stopping, or a time when the heating device is switched from stopping to operation is a reference time, a coefficient for the temperature value is determined for each of the temperature of the structure or the machining space, and the heating temperature such that the coefficients for the temperature values are determined taking into account time that has elapsed since a most recent reference time, and
in the temperature estimation step, a temperature of the portion having no temperature sensor is estimated on the basis of the temperature of the structure or the machining space, the heating temperature, and the coefficients for the temperature values.

8. The temperature estimation method, for a machine tool, according to claim 2, wherein the time constant is set according to at least one of a workpiece, a tool, a jig, and tooling.

9. A thermal displacement correction method, for a machine tool, for correcting, in a machine tool having a plurality of portions to which temperature sensors, respectively, are attached, and a portion to which the temperature sensor is not attached, thermal displacement of the portion to which the temperature sensor is not attached, the thermal displacement correction method comprising:
a portion-having-no-sensor temperature estimation step of estimating a temperature of the portion to which the temperature sensor is not attached, by using the temperature estimation method according to claim 1;
a thermal displacement calculation step of calculating a thermal displacement amount by using the estimated temperature; and
a correction step of correcting a cutter edge position of a tool, on the basis of the calculated thermal displacement amount.

10. The temperature estimation method according to claim 2, wherein:
the method comprises performing sequential calculations at certain time intervals, wherein
given that:
time intervals at which the calculation is performed are represented by $\Delta t$,
a current value is represented by (n),
a value obtained by the calculation performed at a previous time
is represented by (n−1),
the temperature information is represented by $\theta_c(n)$, $\theta_1(n)$,
the coefficient is represented by $p_c(n)$, $p_1(n)$,
the time constants are represented by $T_1$, $T_2$, and
the operation information is represented by u(n), the estimated temperature $\theta_0(n)$ is calculated by expressions below:

$$q_1(n) = q_2(n-1) + \frac{\Delta t}{\Delta t + T_1}\{u(n) - q_1(n-1)\}$$

$$q_2(n) = q_2(n-1) + \frac{\Delta t}{\Delta t + T_2}\{u(n) - q_2(n-1)\}$$

-continued $$u(n) = \begin{cases} 1: \text{Operation information ON} \\ 0: \text{Operation information OFF} \end{cases}$$

$T_1 < T_2$ $p_c(n) = kq_1(n)$ $p_1(n) = 1 - kq_2(n)$ $0 \leq k \leq 1$ and $\theta_0(n) = p_c(n)\theta_c(n) + p_1(n)\theta_1(n) - \alpha\{q_1(n) + q_2(n)\}$.

* * * * *